United States Patent
Bantz et al.

(10) Patent No.: US 7,209,961 B2
(45) Date of Patent: Apr. 24, 2007

(54) AUTONOMIC CONTEXT-DEPENDENT COMPUTER MANAGEMENT

(75) Inventors: David F. Bantz, Bedford Hills, NY (US); Steven Depp, Katonah, NY (US); Steven J. Mastrianni, Unionville, CT (US)

(73) Assignee: Lenovo (Singapore) Pte, Ltd., Singapore (SG)

( * ) Notice: Subject to any disclaimer, the term of this patent is extended or adjusted under 35 U.S.C. 154(b) by 799 days.

(21) Appl. No.: 10/329,848

(22) Filed: Dec. 26, 2002

(65) Prior Publication Data

US 2004/0139184 A1 Jul. 15, 2004

(51) Int. Cl.
*G06F 15/13* (2006.01)
(52) U.S. Cl. .................. 709/220; 709/221; 709/224
(58) Field of Classification Search ............. 709/220, 709/221, 224
See application file for complete search history.

(56) References Cited

U.S. PATENT DOCUMENTS

| | | | |
|---|---|---|---|
| 6,205,476 B1 | 3/2001 | Hayes, Jr. | |
| 6,539,425 B1 * | 3/2003 | Stevens et al. | 709/220 |
| 6,584,502 B1 * | 6/2003 | Natarajan et al. | 709/224 |
| 2002/0026505 A1 * | 2/2002 | Terry | 709/221 |
| 2003/0126240 A1 * | 7/2003 | Vosseler | 709/221 |
| 2004/0059810 A1 * | 3/2004 | Chess et al. | 709/224 |

* cited by examiner

*Primary Examiner*—Jeffrey Pwu
*Assistant Examiner*—Jinsong Hu
(74) *Attorney, Agent, or Firm*—Scully, Scott, Murphy & Presser, P.C.

(57) ABSTRACT

A method and system for managing a group of computer applications operating on a computer. The method comprises the steps of establishing a set of policies for operating the applications under a variety of circumstances, each of the circumstances being associated with one of the policies and each of the policies setting forth a behavior to occur under the associated circumstance; and monitoring the environment of the computer to determine when one of the circumstances occurs. When one of the circumstances is determined as occurring, a search is made through the set of policies to identify the policy associated with said one of the circumstances, and said group of computer applications is operated in accordance with the behavior set forth in said associated policy.

20 Claims, 6 Drawing Sheets if change_notification. type=
   to-presentation_mode and
   change_notification. source =
   PowerPoint_process then
   Presentation_mode_situation;

if DAYOFWEEK=SAT or DAYOFWEEK=
   SUN then SameTime_process.kill;

AUTONOMIC CONTEXT-DEPENDENT COMPUTER MANAGEMENT

BACKGROUND OF THE INVENTION

1. Field of the Invention

This invention generally relates to computer management, and more specifically, the invention relates to automatically managing operations on a computer. Even more specifically, the invention relates to methods and systems, particularly well suited for use with personal computers, for automatically managing one or more software operations based on rules provided by a user and the states or conditions of other applications on the computer.

2. Background Art

In personal computing, the behavior of the personal computer (PC) is determined by its system and application software. The behavior of one application is almost always totally independent of any other. This is because the user does not want an application's behavior to depend on whether other applications are active or not. If it were, the user would have to understand why and adapt his or her use of that application.

But there are times when it is useful to modify the behavior of an application when executed in the presence of others. A common case is when the user's expectations are that the PC's overall behavior is to be determined by one and only one application. This may be due to a prioritization on the user's part. For example, the user may be urgently in need of the results of a single application—say a programming language compiler—and may want to defer all other use of the PC for other purposes so as to reduce the amount of time he or she will have to wait. Or the user may be using the PC in a public context, say for a presentation, and want the PC to be dedicated to that purpose without interruption, either by compute-intensive processes such as an anti-virus scan or by processes that might share the display, such as instant messaging.

It is possible for the user to manually reconfigure the PC's execution environment to achieve these ends. For example, the user can use the Windows Task Manager to kill all applications and processes that might interfere with his or her desired purpose. But this manual reconfiguration requires time, effort and most importantly considerable insight into the software configuration. If not performed correctly, the reconfiguration can damage the operation of the PC, potentially rendering it unfit for any purpose. Moreover, manual reconfiguration would be required again when the PC is returned to normal operation. This may require launching applications with specific parameters, again a skill- and knowledge-intensive task that is prone to error and potential environment damage.

Were it possible to capture the tasks necessary to reconfigure the PC's execution environment in computer-readable form, and to build an engine, driven by this representation, to carry them out, the modification of the overall behavior of the PC could be automated. If it were additionally possible to recognize situations where reconfiguration is needed automatically, then the user would see a most desirable form of PC behavior in which his or her needs are recognized and accommodated automatically.

SUMMARY OF THE INVENTION

An object of this invention is to improve methods and systems for managing computer operations.

Another object of the invention is to provide a method and system for implementing automatic recognition of, and accomplishment of, reconfiguration of a computer's execution environment in a set of circumstances defined by the end user.

These and other objectives are attained with a method and system for managing computer operations. The method comprises the steps of establishing a set of policies for operating the computer under a variety of circumstances, each of the circumstances being associated with one of the policies and each of the policies setting forth a behavior to occur under the associated circumstance; and monitoring the environment of the computer to determine when one of the circumstances occurs. When one of the circumstances is determined as occurring, a search is made through the set of policies to identify the policy associated with said one of the circumstances, and said the computer is operated in accordance with the behavior set forth in said associated policy. It may be noted the present invention may be used to manage a wide range of operations and types of operations. For instance, these operations may be hardware operations, software application, or system operations.

The preferred embodiment of the invention, described below in detail, implements automatic recognition of, and accomplishment of, reconfiguration of the PC's execution environment in a set of circumstances defined by the end user. This set of circumstances is expressed in terms of policies. The user defines what behavior is to occur in each circumstance—that is, what the system policy is to be in each circumstance. A recognizer recognizes when the circumstance exists and invokes the policy-driven engine to automatically reconfigure the PC to the end user needs.

An important value of this invention to the end user is improved ease of use, including more effective use of the PC for presentations. Interruptions to the presentation are avoided, avoiding embarrassment and unproductive presentation time.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
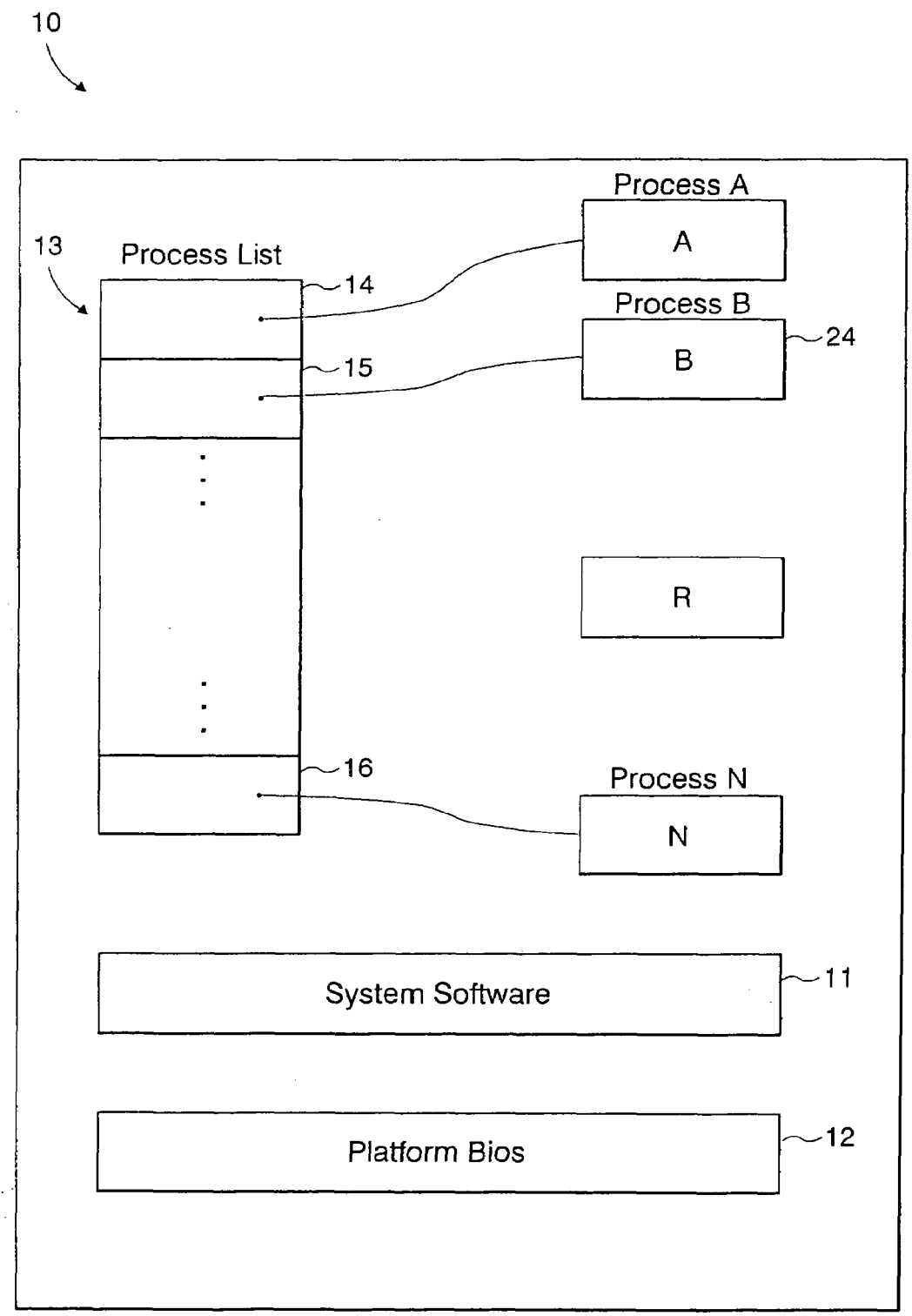
FIG. 1 schematically illustrates the software environment of a personal computer.

FIG. 1 shows a schematic view of the software environment 10 of a PC, including its system software 11 and its Basic Input/Output System (BIOS) 12. Specifically, process list 13 contains entries 14–16 for each and every runnable process 17–19. Processes can run independently or can communicate and coordinate with each other, and the system services implemented in system software 11 and platform BIOS 12 are available to them. An end user application is typically implemented as one or more processes. There may be one or more processes active to provide system services as well.

Launching an end user application must be done using the services of system software 11, which manages the creation, scheduling and removal of all processes 17–19. Thus, system software 11 is aware of all changes in the PC software environment 10.

Figure 2:
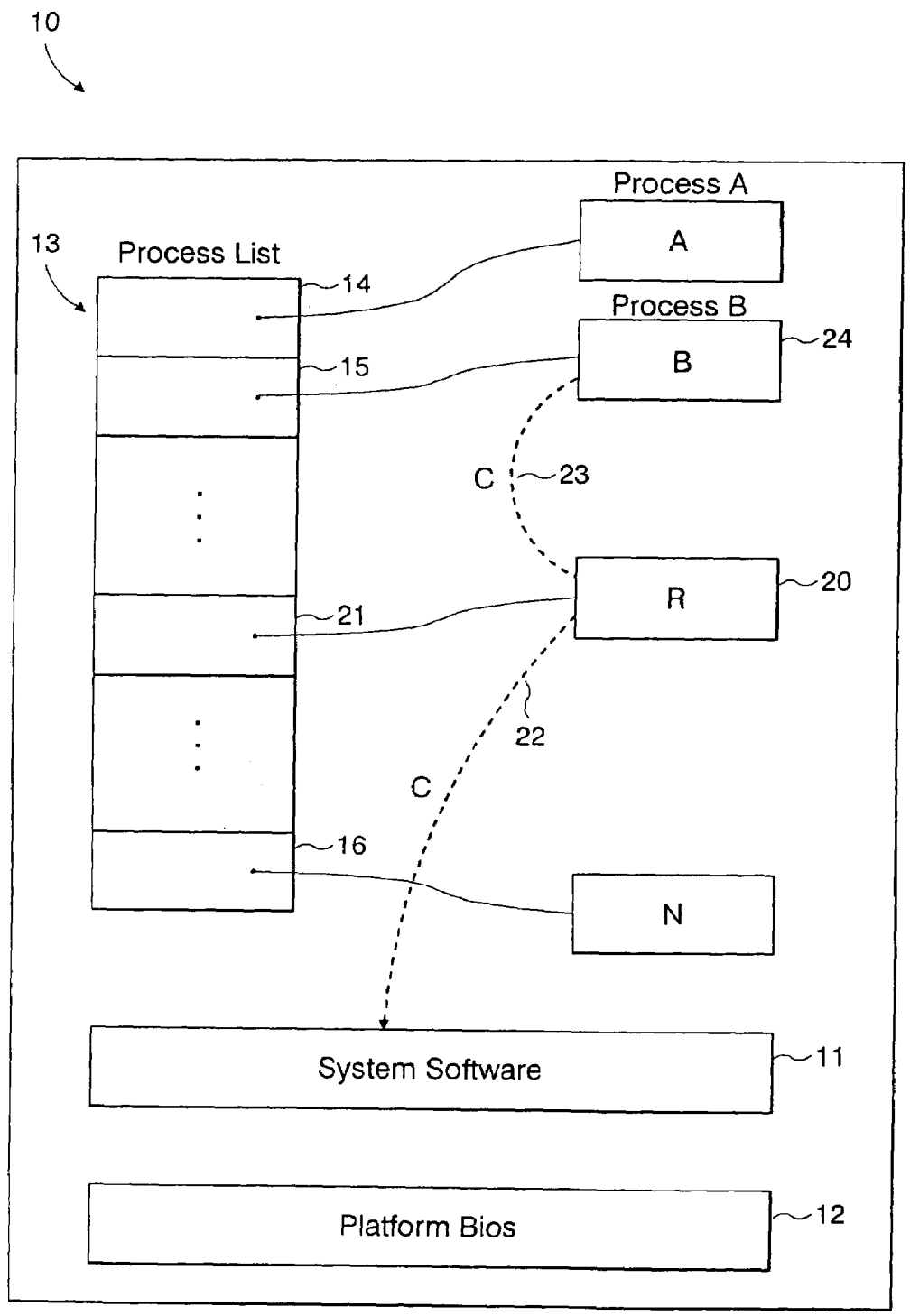
FIG. 2 is similar to FIG. 1 but also shows a recognizer process in accordance with the present invention.

FIG. 2 repeats FIG. 1 with the addition of a new process R 20, referred to as the "recognizer" process. Since this process is potentially active, it has a corresponding entry 21 in process list 13. The recognizer process 20 is launched as is any other application through the system services of system software 11. The recognizer process 20 makes use of system software services to be notified of any change in the PC software environment 10 via change notification 22. The recognizer process waits (makes itself not schedulable) until the receipt of the change notification 22, which is preferably implemented as an event. Events and process management are described by Andrew S. Tannenbaum in his book *Modern Operating Systems*, Prentice-Hall, publishers.

FIG. 2 also shows that recognizer process 20 can receive change notification 23 from another process 24. The use and function of change notifications 22 and 23 are described below in detail.

Upon receipt of change notification 22, the recognizer process 20 performs certain analyses of the change in the PC software environment 10 with the help of services provided by system software 11, with the goal of determining further changes that should be made to the PC software environment 10 in accordance with the policies established by the end user. Such changes may include, but are not limited to, changes in the scheduling priorities of processes including termination of processes, changes to the state of system software including precluding the launching of new applications and changes to the state of the platform BIOS including display screen parameters and power management goals.

Figure 3:
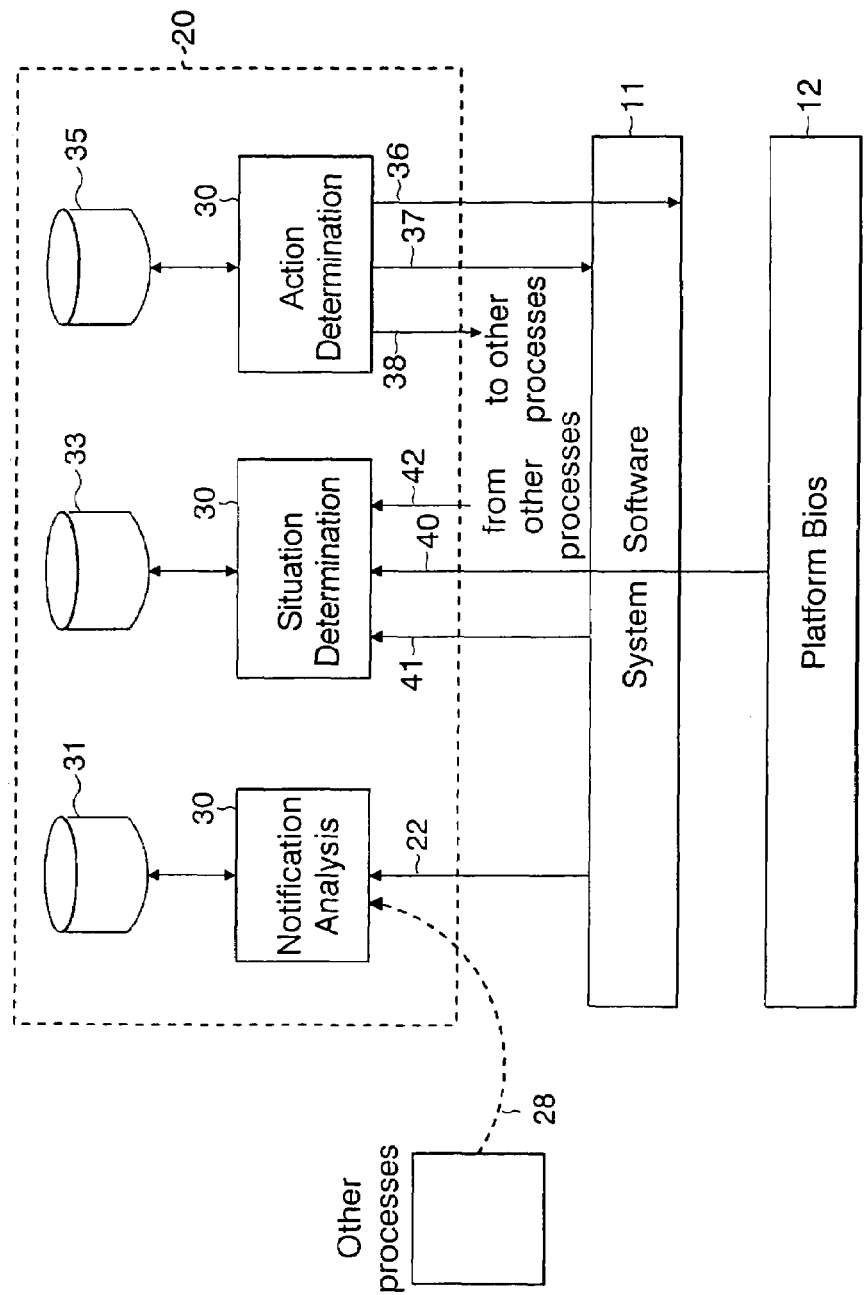
FIG. 3 depicts the structure of the recognizer process.

FIG. 3 shows the structure of the recognizer process 20 in greater detail. It is comprised of notification analysis 30 according to notification rules 31, situation determination 32 according to situation rules 33, and action determination 34 according to policy and action rules 35. Actions are implemented through use of selected services 36 of the platform BIOS 12, selected services 37 of the system software 11 and additionally through direct communication 38 to selected other processes.

The purpose of notification analysis 30 is to analyze change notification 22 so as to detect changes in the PC software environment 10 of FIG. 2 that may require action by recognizer process 20. Many changes in PC software environment 10 will call for no action on the part of recognizer process 20. Notification analysis 30 consults notification rules base 31 to perform a filtering analysis so as to allow the recognizer process 20 to quickly determine that no action is needed and simply wait for the next change notification 22. This minimizes the processing overhead of the recognizer process 20, improving performance and saving power.

The purpose of situation determination 32 is to analyze changes in the PC software environment 10 of FIG. 2 that potentially will require action by recognizer process 20. As this analysis may require processing and storage access, it is desirable to limit this analysis only to those cases where action is potentially required. Notification analysis 30 does not activate situation analysis 31 unless this is the case.

Situation determination 32 makes reference to situation rules base 33 in order to determine what situation has been created due to the change in PC software environment 10 of FIG. 2, as signaled by change notification 22. A situation is one of a discrete set of values, each representing a particular PC software environment 10 of FIG. 2 or a group of such environments. It is to be appreciated that the PC software environment 10 of FIG. 2 may take on an almost limitless number of states, and the purpose of situation determination 32 is to recognize individual states or groups of states such that if the PC software environment 10 state is identical to or a subset of any of these states or groups of states, subsequent action by the recognizer process to further modify the PC software environment 10 should be taken. It is expected that, typically the number of possible situations is significantly less than the number of states of the PC software environment 10 of FIG. 2.

Situation determination 32 makes use of information obtained from platform BIOS 12 via path 40, from system software via path 41 and from selected other processes via path 42. This information is used in order to determine the state of the PC software environment 10.

An example may help to better understand the role of situation determination 32. If the end user has established rules and policies that constrain the functions of other applications when a presentation application is active and in presentation mode, the situation of interest is that one of a set of presentation applications (e.g., Microsoft PowerPoint, Lotus Freelance) has been launched and that the end user has interacted with the application to put it into presentation mode. If this situation exists and is detected by the combination of notification analysis 30 and situation determination 32, then recognizer process 20 proceeds to determining an appropriate set of actions, including suspending or terminating other processes that could potentially interfere with the presentation.

FIG. 3 additionally shows action determination 34, which reacts to the determination of a situation by situation determination 32. Action determination 34 uses the situation together with policy and action rules base 35 to determine one or a sequence of actions, each to be taken through interaction 36 with the platform BIOS 12, interaction 37 with the system software 11 or interaction 38 directly with other processes. These interactions can be implemented as direct calls to published programming interfaces, or as events sent to the appropriate destination, or in any other suitable manner. The actions function to change the state of PC software configuration 10 of FIG. 2.

An example may help to better understand the role of action determination 34 through its actions 36–38. With reference to the previous example of situation determination, in which the situation is that the end user has caused the launching of a presentation application and set its mode to presentation mode, it may be the case that the user has established policies and action rules that cause any other applications that might claim display screen area to quiesce. One such application is the client for instant messaging, which in some implementations claims priority for use of the display and "pops up" over the window being used by any currently running application. In this case, action determination 34 would determine that it must signal the process currently running instant messaging that it may not claim display screen area with priority higher than that of the presentation application. It may also be the case that the user has established policies and action rules that suspend the actions of the platform BIOS 12 and system software 11 to conserve power by shutting off the display screen during periods of lack of activity of the various input devices (keyboard, mouse). In this case, action determination 34 would call power management system services supported by system software 11 and platform BIOS 12, causing these software not to shut off the display screen.

Figure 4:
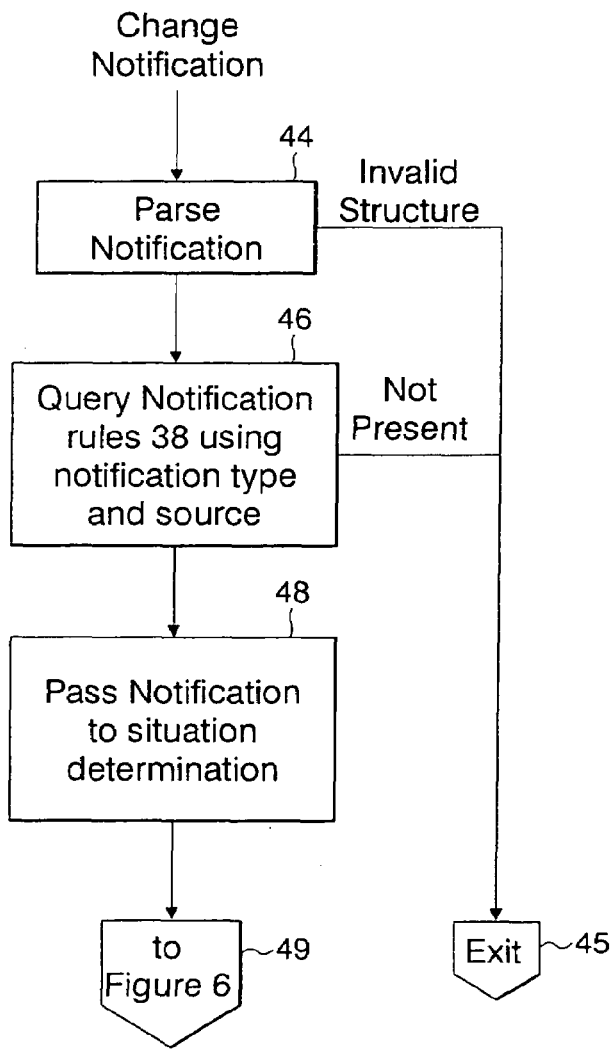
FIG. 4 is a flow chart showing the operation of a change notification procedure of the recognizer process.

FIG. 4 shows one suitable processing flow for notification analysis 30 in FIG. 3. The processing begins with the receipt of a change notification 22. Processing block 43 parses the representation of change notification 22 to obtain its type and source. If the representation is invalid, a branch is taken to exit 45 which causes the recognizer process 20 to wait for another change notification 22.

Figure 5:
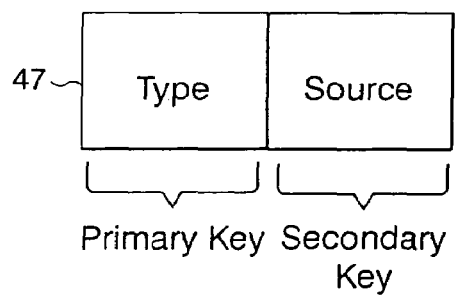
FIG. 5 illustrates a notification rule that may be used in the procedure of FIG. 4.

If the structure of the change notification 22 is correct, its type and source are used in block 46 to query notification rules base 31. Notification rules base 31 may be a formal database, as, for example, IBM DB2 Universal Database or a simple database as, for example, the open source database MySQL. Alternatively, a specialized representation of notification rules may be constructed, for example using the Java programming language HashTable class. Preferably, notification rules can be stored using a specialized in-memory representation cached from a more formal storage-resident form. Since it is expected that, in many applications, change notifications will be very frequent, but that only a few of them will require action, an in-memory representation is both efficient and realistic. In FIG. 5, a simple form of notification rule 47 is shown, in which the primary key is the notification type and the secondary key is the notification source. Since the purpose of notification analysis 30 in FIG. 3 is to determine if the change notification 22 is relevant, this representation 47 is sufficient.

If the result of the query in block 46 is that the type and source are not present in the notification rules base 31, a branch is taken leading to immediate exit 45 from the requestor process 20, in which the requestor process 20 waits for another change notification 22. If the result of the query in block 46 is that the type and source are present in the notification rules base 31, block 48 is entered in which the change notification 22, as parsed by block 44, is passed on to the situation determination step 32 in FIG. 3 via exit 49.

Figure 6:
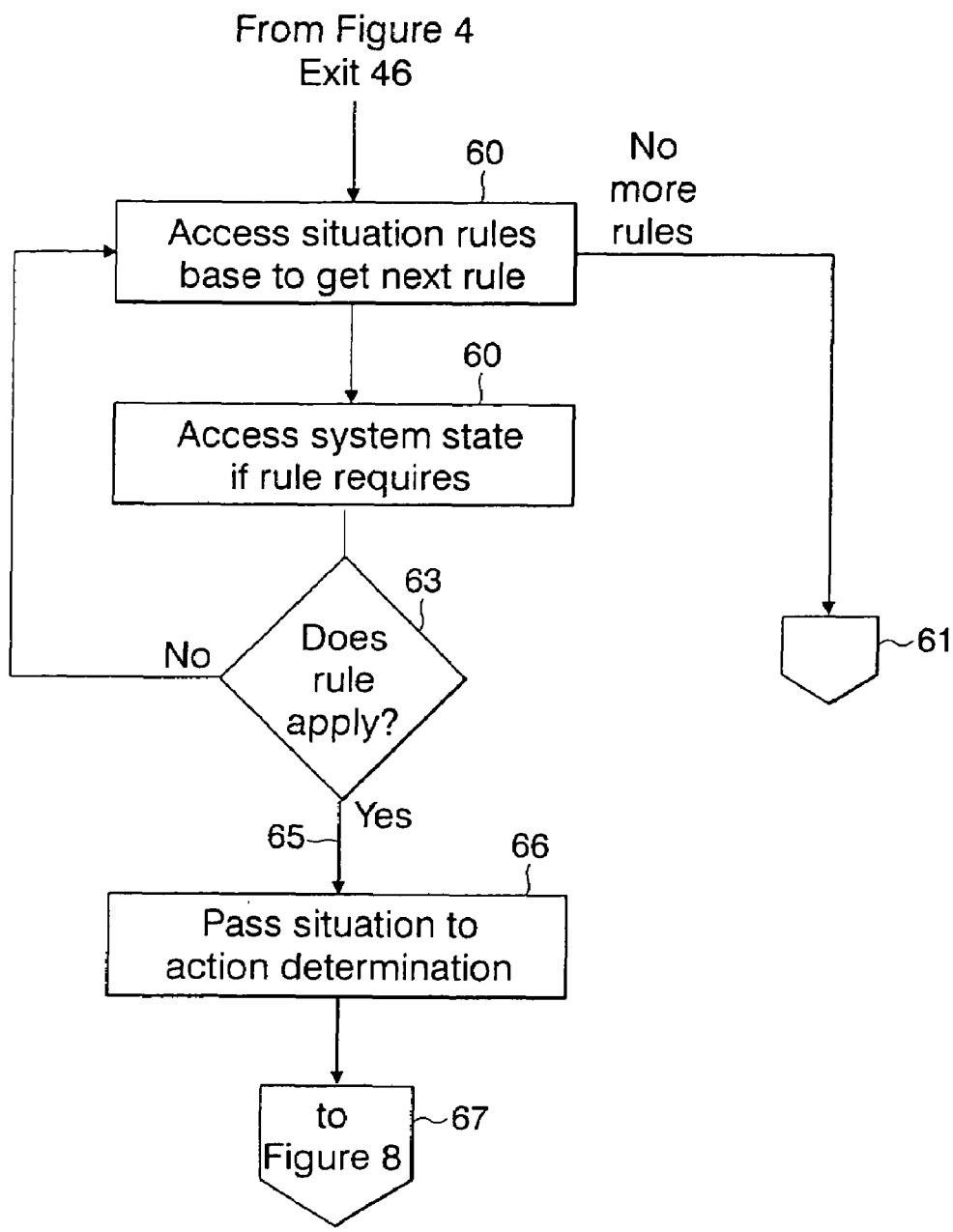
FIG. 6 is a flow chart showing the operation of a situation determination procedure of the recognizer process of FIG. 3.
Figures 7, 8, 9:
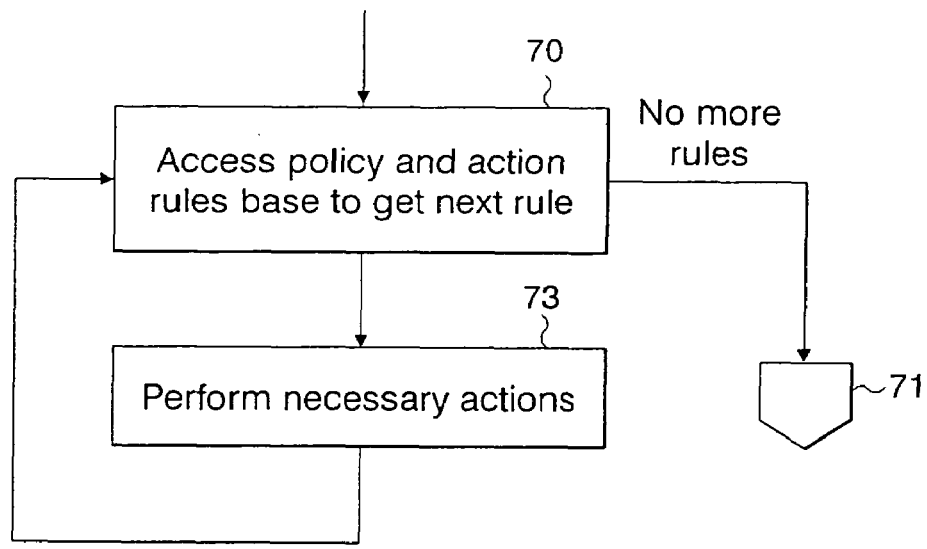
FIG. 7 shows an example of a situation rule that may be used in the situation determination procedure.
FIG. 8 depicts the operation of an action determination procedure of the recognizer process.
FIG. 9 illustrates an action rule that may be used in the present invention.

FIG. 6 shows the logic flow of situation determination 32 in FIG. 3. This flow begins with the receipt of a situation from exit 49 in FIG. 4. A situation can be represented by an enumerated variable with each distinct value representing a state or group of states of the PC software environment 10 in FIG. 2. In block 60, the situation is used as a key to access the situation rules base 33 in FIG. 3. In this case, there may be many rules that correspond to a given situation. An example rule is illustrated in FIG. 7. Block 60 gets the next rule from the rules base 33. If there are no more rules, a branch is taken which exits 61 the recognizer process 20 of FIG. 3, causing it to wait for the next change notification 22.

If a rule is found, block 62 is entered, which accesses other components of the state of the PC software environment 10 of FIG. 2 via paths 40–42 of FIG. 3. This access may be by reading globally accessible variables, or by invoking system services, or by some means of interprocess communication or by any other means. Once these components of state have been retrieved in block 62, decision block 63 is entered. This block interprets the rule to determine whether it applies. As an example, FIG. 7 gives a typical situation rule. This rule does not require any system state access in block 62—it can be evaluated solely with the type and source of the change notification 22 of FIG. 3. The result is a value of the situation, namely presentation_mode-situation. If the source and type of the change notification 22, as received by situation determination 32 from notification analysis 30, match the corresponding fields of the rule, block 63 will succeed and branch 65 will be taken. Block 66 will then pass the situation on to action determination 34 of FIG. 3 via exit 67.

It will be appreciated that situation rules may be more complex than that shown in FIG. 7, and specifically these rules may be extended to examine the state of the PC software environment. This extension can be done, for example, by adding a while clause to the rule which specifies specific values of the system state. A while clause might check the process list 13 of FIG. 1 for the presence or absence of a specific process, or for a power management state.

FIG. 8 illustrates the logic flow of action determination 34 in FIG. 3. A situation is received from situation determination 32 in block 70, which accesses the policy and action rules base 35 to get the next rule. There may be many action rules associated with a given situation. If there are no more rules, branch 71 is taken and the recognizer process 20 is exited, to wait for the arrival of the next change notification 22.

If at block 70 a rule is accessed, then block 73 is entered to perform any actions as specified by the rule. FIG. 9 illustrates a typical action rule. This rule shown in FIG. 9 is conditional on system state: it requires that a call be made to system software 11 to retrieve the current day of the week, and the rule only takes effect if that day is Saturday or Sunday. The action taken is to send a kill event to the process currently active for the SameTime application, if any. There might be a second rule specifying that if the day of the week is not Saturday or Sunday, a quiesce event should be sent to the process currently active for the SameTime application.

It will be apparent that the rule illustrated in FIG. 9 specifies an action under a policy: the user specifies a policy for the behavior of the PC software environment when a presentation is active that depends on the day of the week. Other forms of action rules are possible and useful The preferred embodiment of the invention, as described above in detail, provides a simple, but complete implementation of autonomic self-configuring behavior in which changes to the PC software environment cause other changes on behalf of the end user. This accomplishes the goal of automating the complex and often error-prone manual process that users must perform in order to use a PC for certain tasks such as public presentations. The behavior may be made sensitive to policies that the user chooses.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of managing a group of computer applications operating on an individual computer, the method comprising the steps of:
   establishing a set of policies for operating the applications on said individual computer under a variety of circumstances, each of the circumstances being associated with one of the policies and each of the policies setting forth a behavior to occur under the associated circumstance;
   monitoring the environment of the individual computer to determine when one of the circumstances occurs;
   when one of the circumstances is determined as occurring, reconfiguring the execution environment of said individual computer by
   i) searching through the set of policies to identify the policy associated with said one of the circumstances, and
   ii) operating said group of computer applications on said individual computer in accordance with the behavior set forth in said associated policy.

2. A method according to claim 1, wherein:
   the monitoring step includes the steps of
   i) providing a recognizer process, and
   ii) notifying the recognizer process of changes in the operating environment of the computer; and
   the searching step includes the step of using the recognizer process to perform the searching.

3. A method according to claim 2, wherein:
   the step of providing a recognizer process includes the steps of
   i) providing a notification routine,
   ii) establishing a notification base having a list of changes that may require changes to the operating environment of the computer; and
   the monitoring step includes the further step of, when the recognizer process receives notification of a change in the operating environment of the computer, invoking the notification routine to determine if said change requires further action by the recognizer process.

4. A method according to claim 3, wherein:
   the step of providing a recognizer process includes the further steps of
   i) providing a situation determination routine, and
   ii) establishing a situation rules base identifying a set of states; and
   the monitoring step includes the step of, when the notification routine determines that further action by the recognizer process is required, invoking the situation determination routine to determine if the software environment of the computer is one of said states.

5. A method according to claim 4, wherein the step of invoking the situation determination routine includes the steps of:
   passing the change notification from the notification routine to the situation determination routine;
   using the change notification as a key to access one or more rules in the situation rules base; and
   for each of the accessed rules, analyzing the rule to determine if the rule meets defined criteria.

6. A method according to claim 4, wherein:
   the step of providing a recognizer process includes the further steps of
   i) providing an action determination routine, and
   ii) providing an action rules base;
   the step of establishing a set of policies includes the step of establishing sets of action rules in the action rules base;
   the searching step includes the step of, when the situation determination routine determines that the software environment of the computer is one of said states, invoking the action determination routine to identify one of said sets of action rules in the action rules base; and
   the operating step includes the step of operating the computer applications in accordance with the rule or rules in said identified set of action rules.

7. A method according to claim 1, wherein:
   said individual computer is operated by an end user; and
   the establishing step includes the step of said end user defining each of the policies.

8. A method according to claim 7, wherein one of said policies is to prevent a designated one of the applications from being interrupted by any other of the applications, and the operating step includes the step of, under a defined one of the circumstances, operating said designated one of the applications and preventing said designated one of the applications from being interrupted by any other of the applications.

9. A system for managing a group of computer applications operating on an individual computer, the system comprising:
   a database holding a set of policies for operating the applications on said individual computer under a variety of circumstances, each of the circumstances being associated with one of the policies and each of the policies setting forth a behavior to occur under the associated circumstances; and
   means for monitoring the environment of the individual computer to determine when one of the circumstances occurs; and when one of the circumstances is determined as occurring, for reconfiguring the execution environment of said individual computer by searching through the set of policies to identify the policy associated with said one of the circumstances, and operating said group of computer applications on said individual computer in accordance with the behavior set forth in said associated policy.

10. A system according to claim 9, wherein:
    the monitoring means includes a recognizer, and means for notifying the recognizer of changes in the operating environment of the computer;
    when said one of said circumstances is determined as occurring, the recognizer performs the searching; and
    said database is on said individual computer.

11. A system according to claim 10, wherein:
    the recognizer includes a notification routine, and a notification base having a list of changes that may require changes to the operating environment of the computer; and
    when the recognizer receives notification of a change in the operating environment of the computer, the recognizer invokes the notification routine to determine if said change requires further action by the recognizer.

12. A system according to claim 11, wherein:
    the recognizer further includes a situation determination routine, and a situation rules base identifying a set of states: and
    when the notification routine determines that further action by the recognizer process is required, the recognizer invokes the situation determination routine to determine if the software environment of the computer is one of said states.

13. A system according to claim 12, wherein:
the recognizer further includes means for parsing the change notification from the notification routine to the situation determination routine when the notification routine determines that further action by the recognizer is required; and
the situation determination routine uses the change notification as a key to access one or more rules in the situation rules base; and for each of the accessed rules, analyzes the rule to determine if the rule meets defined criteria.

14. A system according to claim 12, wherein:
the recognizer further includes an action determination routine and an action rules base;
each of the policies includes a set of action rules;
when the situation determination routine determines that the software environment of the computer is one of said states, the action determination routine is invoked to identify one of said sets of action rules in the action rules base; and
the operating means operates the computer applications in accordance with the rule or rules in said identified set of action rules.

15. A program storage device readable by machine, tangibly embodying a program of instructions executable by the machine to perform method steps for managing a group of computer applications operating on an individual computer, said method steps comprising:
establishing a set of policies for operating the applications on said individual computer under a variety of circumstances, each of the circumstances being associated with one of the policies and each of the policies setting forth a behavior to occur under the associated circumstance;
monitoring the environment of the individual computer to determine when one of the circumstances occurs; and
when one of the circumstances is determined as occurring, reconfiguring the execution environment of said individual computer by
i) searching through the set of policies to identify the policy associated with said one of the circumstances, and
ii) operating said group of computer applications on said individual computer in accordance with the behavior set forth in said associated policy.

16. A program storage device according to claim 15, wherein:
the monitoring step includes the steps of
i) providing a recognizer process, and
ii) notifying the recognizer process of changes in the operating environment of the computer; and
the searching step includes the step of using the recognizer process to perform the searching.

17. A program storage device according to claim 16, wherein:
the step of providing a recognizer process includes the steps of
i) providing a notification routine,
ii) establishing a notification base having a list of changes that may require changes to the operating environment of the computer; and
the monitoring step includes the further step of, when the recognizer process receives notification of a change in the operating environment of the computer, invoking the notification routine to determine if said change requires further action by the recognizer process.

18. A program storage device according to claim 17, wherein:
the step of providing a recognizer process includes the further steps of
i) providing a situation determination routine, and
ii) establishing a situation rules base identifying a set of states; and
the monitoring step includes the step of, when the notification routine determines that further action by the recognizer process is required, invoking the situation determination routine to determine if the software environment of the computer is one of said states.

19. A program storage device according to claim 18, wherein the step of invoking the situation determination routine includes the steps of:
passing the change notification from the notification routine to the situation determination routine;
using the change notification as a key to access one or more rules in the situation rules base; and
for each of the accessed rules, analyzing the rule to determine if the rule meets defined criteria.

20. A program storage device according to claim 18, wherein:
the step of providing a recognizer process includes the further steps of
i) providing an action determination routine, and
ii) providing an action rules base;
the step of establishing a set of policies includes the step of establishing sets of action rules in the action rules base;
the searching step includes the step of, when the situation determination routine determines that the software environment of the computer is one of said states, invoking the action determination routine to identify one of said sets of action rules in the action rules base; and
the operating step includes the step of operating the computer applications in accordance with the rule or rules in said identified set of action rules.

* * * * *